United States Patent [19]
de Rosa

[11] 3,948,561
[45] Apr. 6, 1976

[54] HEAD REST MOUNTING

[75] Inventor: Daniel de Rosa, Boulogne-Billancourt, France

[73] Assignees: Regie Nationale des Usines Renault, Boulogne-Billancourt; Automobiles Peugeot, Paris, both of France

[22] Filed: Jan. 9, 1975

[21] Appl. No.: 539,804

[30] Foreign Application Priority Data
Jan. 18, 1974  France .............................. 74.01736

[52] U.S. Cl. .............................................. 297/391
[51] Int. Cl.² ............................................ A47C 1/10
[58] Field of Search ............ 297/391, 397, 403–410; 403/252, 256, 263; 285/401, 402

[56]  References Cited
UNITED STATES PATENTS
3,009,719  11/1961  Otto et al............................ 403/252
3,376,064  4/1968  Jackson .............................. 297/391

*Primary Examiner*—James C. Mitchell
*Attorney, Agent, or Firm*—Fleit & Jacobson

[57]  ABSTRACT

This detachable head rest for the driver and passengers of a motor vehicle is of the type comprising one or more supports in the form of rods, each rod being fastened for example by screwing in a socket bearing on the top of the seat back upholstery. This socket engages a strap rigid with the frame structure of the back rest and comprises at its upper end a flange for engaging said upholstery and at its lower end a retaining portion carrying a pin adapted, in a given position of said socket about its axis, to clear a notch formed in the lower edge of said strap to permit the removal of the head rest when required.

3 Claims, 4 Drawing Figures

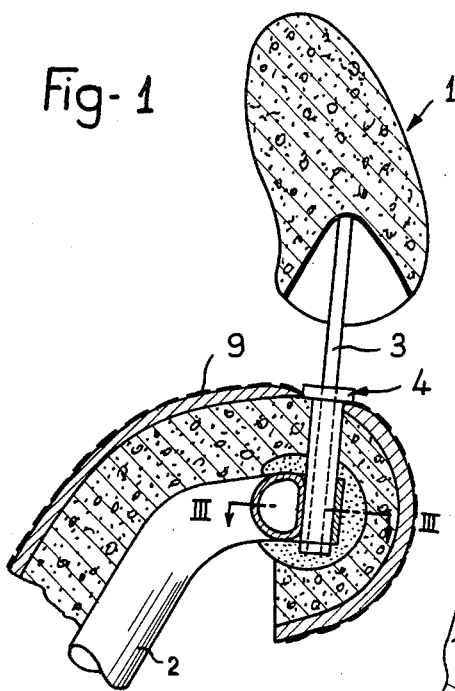
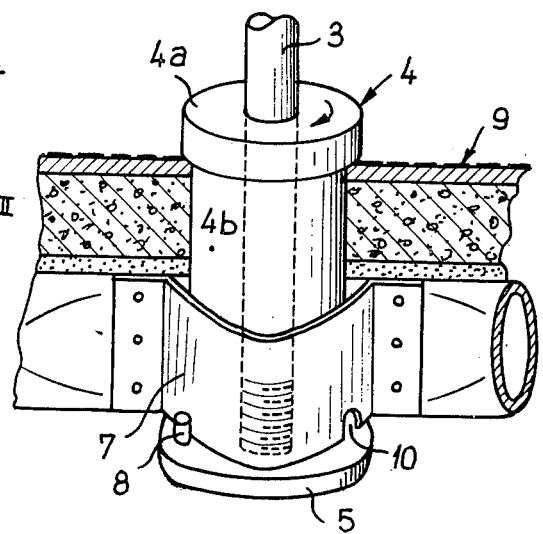
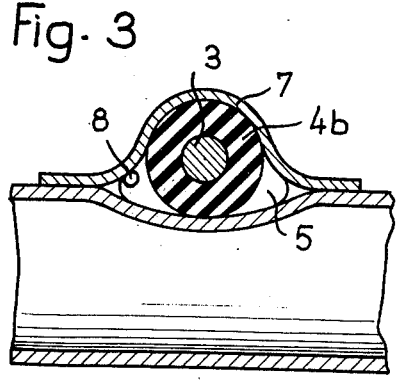
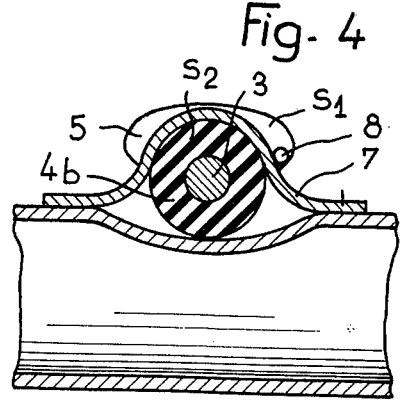

HEAD REST MOUNTING

The present invention relates in general to head rests for automobile use and more specifically to devices for securing head rests to the back rest structure of automobile seats.

Various designs of head rests and like devices for maintaining the heads of the passengers of motor vehicles, which devices are secured to the back rest structure of the vehicle seats, have already been proposed. Some consist simply of a properly shaped upper extension of the upholstered back rest, others comprise detachable accessories adapted to be rigidly or movably inserted, secured or screwed into or on the seat back rest.

In fact, it is known that the increasing tendency to use motor vehicles on relatively long mileages and relatively long journeys, has led motorists to fit, at least on their front seats, head rests enabling the passengers of these seats to take a rest occasionally. However, these head rests, although very convenient for the purpose, interfere with the visibility to the rear and are therefore detrimental, especially under town driving conditions. As a result, users are induced, if the head rest is of the detachable type, to remove same from the seat and stow it away.

It is also known that in case of crash the passenger and/or the driver, depending on circumstances, may be pressed with force against the seat back-rest. In this case, it is desirable that the forces involved be distributed over a relatively large surface area without creating a condition of unbalance between the trunk and the head, but this is not always obtained with existing devices.

It is therefore the primary object of the present invention to avoid the inconveniences set forth hereinabove and reduce the frequency and seriousness of neck wounds in case of crash, by providing an improved device for securing the head rest to the back rest of the seat of a motor vehicle, this device being capable of withstanding the force exerted on the driver's or passenger's head in case of sudden and strong acceleration in the backward direction.

It is another object of this invention to provide a detachable head rest for the purpose set forth hereinabove, which is adapted to be removed at will for example when it is desired to clear the field of vision to the rear. The head rest according to this invention can be removed and re-fitted manually, without resorting to any particular tool.

Another object of this invention consist in providing a head rest securing or mounting device comprising a manually-operated locking and release member consisting advantageously of a socket.

This head rest mounting device, wherein support members rigid with the head rest mounted to the seat frame structure are connected to the back rest frame structure by means of a supporting rod secured to a socket having an upper bearing base portion and also a lower portion designed for retaining the socket in relation to the frame structure, is characterised in that the socket end opposite its bearing base portion carries a retaining member which extends radially outwards, that it is bounded by a passage aperture formed through a seat frame element, said socket being retained in relation to said frame element as a consequence of a rotational movement of said socket about its axis.

The mounting broadly described hereinabove is also advantageous in that the head rests having supporting rods of relatively reduced diameter can be used for these rods can be held against axial translation in their operative position, in relation to said socket, by means of simple screw threads.

In the whole, the mounting device according to this invention comprises supporting rods of relatively reduced dimensions, the same also applying to the seat frame element supporting the mounting socket.

In the drawing:

FIG. 1 is a diagrammatic, part-sectional view of a head rest secured to the back rest of an automobile seat;

FIG. 2 is a perspective view of the mounting device according to this invention;

FIG. 3 is a section taken along the line III—III of FIG. 1, with the socket engaged into the corresponding element of the back rest frame, and FIG. 4 is a view similar to FIG. 3 but showing the socket locked in position with respect to the back rest frame structure.

Referring to the drawing, the head rest designated generally by the reference numeral 1 is connected to the frame structure 2 of the seat back rest 9 by means of supports 3. These supports consist of rods 3 rigid with a horizontal transverse pivot pin (not shown) embedded in the head rest, and engage each a socket 4 of plastic material. To this end, the socket comprises radial retaining means co-acting with means provided on the corresponding support 3.

These retaining means may consist of matching male and female screw threads, but of course other means may be provided for this purpose.

The socket 4 comprises at its upper end a flange 4a of which the bottom annular face constitutes the bearing surface of said socket engaging the top surface of the seat upholstery.

The lower end of socket 4 comprises a retaining portion 5 of which the top surface area $S_1$ is greater than the surface area $S_2$ of the socket body. However, the surface $S_1$ is smaller than the surface area of the flange 4a constituting the bearing surface of socket 4. Preferably, the socket passage aperture is provided by a suitably bent sheet-metal strap 7 having its side arms rigidly secured to the back rest frame structure, said arms bearing against the socket body 4b. Of course, it would not constitute a departure from the basic principle of the present invention to provide, in certain cases, an aperture in said back rest frame structure to permit the passage of the socket retaining portion 5.

The retaining portion 5 carries on the other hand a projecting pin 8 moulded integrally therewith and adapted to engage one arm of said strap 7 of which the other arm has formed therein a notch 10 so dimensioned as to permit the passage of the pin 8 when socket 4 is rotated about the axis of support 3.

The lower end of support 3 is screw-threaded to permit its engagement into socket 4.

The head rest is mounted as follows: Firstly, the rod-like support or supports 3 of head rest 1 are screwed or otherwise secured into socket 4. Then the socket 4 is inserted through the seat upholstery, between the arms of strap 7. To hold the head rest against movement it is only required to rotate slightly the flange 4a until the pin 8 engages the corresponding arm of said strap.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed as new is:

1. A device for mounting a head rest on the back rest of a vehicle seat having a back rest frame structure comprising, in combination, a socket member, means for supporting a head rest on said socket member, a seat frame element on the back rest frame structure defining a passage aperture for accommodating said socket member in an operative position with a head rest supported on said docket member disposed above the back rest, means on said socket member for locking said socket member to said seat frame element in said operative position, said locking means being arranged to permit the insertion of said socket member within said passage aperture in a first rotary position of said socket member with respect to said seat frame element and to lockingly engage said seat frame element in a second rotary position of said socket member to releasably retain said socket member in said operative position.

2. A mounting device in accordance with claim 1 wherein said seat frame element comprises a strap member having opposite ends secured to the back rest frame structure and including a pair of arms for engagement with said socket member accommodated within said passage aperture.

3. A mounting device in accordance with claim 2 wherein said locking means include a radially extending retaining portion on said socket member adjacent the socket member lower end, an upstanding locking pin on said retaining portion and wherein the bottom edge of one of said strap member arms is provided with a notch, said retaining portion having a configuration for passage of said retaining portion through said aperture in said first rotary position, said retaining portion being movable during the rotary movement of said socket member from said first rotary position to said second rotary position into underlying engagement with said strap member with concommitant movement of said pin through said notch into locking engagement with the other of said strap member arms.

* * * * *